United States Patent [19]

Mattes

[11] 4,137,808
[45] Feb. 6, 1979

[54] TOOTH STRUCTURE FOR BURR-FREE CUTTING SAW BLADE

[75] Inventor: Lothar Mattes, Singen, Fed. Rep. of Germany

[73] Assignee: Georg Fischer, Switzerland

[21] Appl. No.: 856,973

[22] Filed: Dec. 2, 1977

[30] Foreign Application Priority Data

Dec. 29, 1976 [CH] Switzerland ............... 16427/76

[51] Int. Cl.² .................. B23D 61/02; B23D 61/12
[52] U.S. Cl. ..................................... 83/851; 83/835
[58] Field of Search ............. 83/835, 851, 855, 849, 83/850

[56] References Cited

U.S. PATENT DOCUMENTS

| 1,240,939 | 9/1917 | Carlson | 83/850 |
| B 2,635,327 | 4/1953 | Enlow | 83/850 |

Primary Examiner—Frank T. Yost
Attorney, Agent, or Firm—Roylance, Abrams, Berdo & Farley

[57] ABSTRACT

A saw blade has teeth formed with cutting edges which are inclined relative to the side surfaces and which extend only partly across the blade width, the cutting edges of successive ones of the teeth extending transversely inwardly from opposite side surfaces of the blade.

4 Claims, 5 Drawing Figures

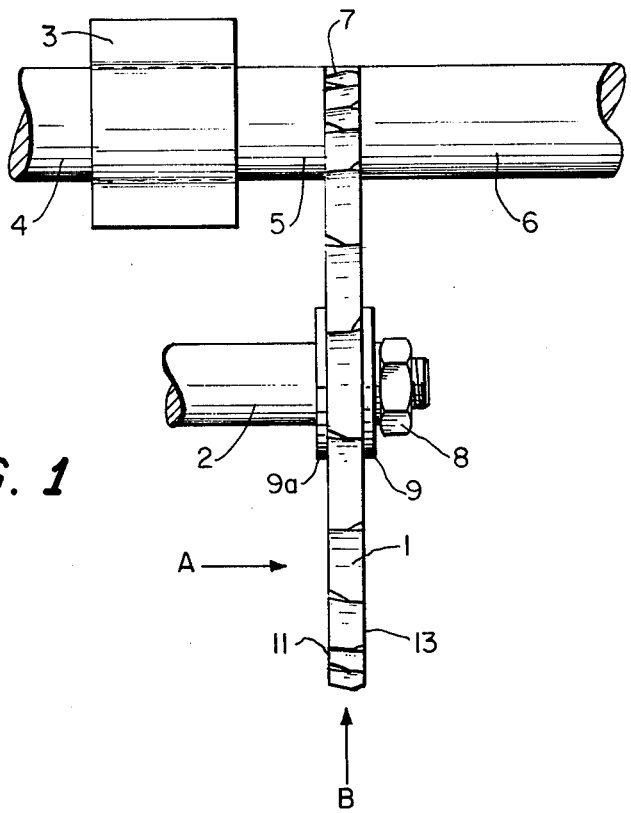
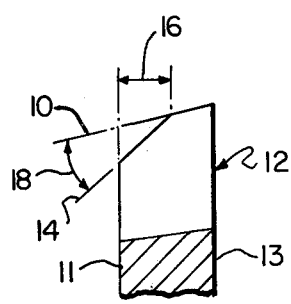
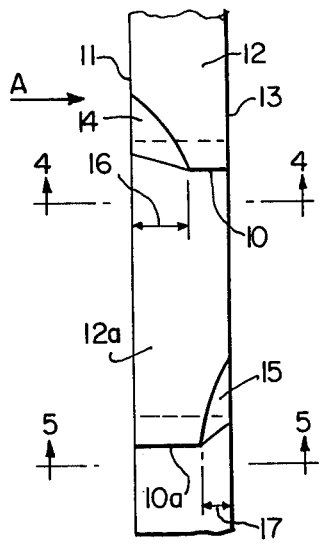
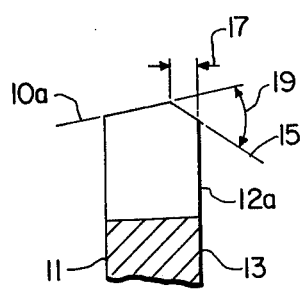
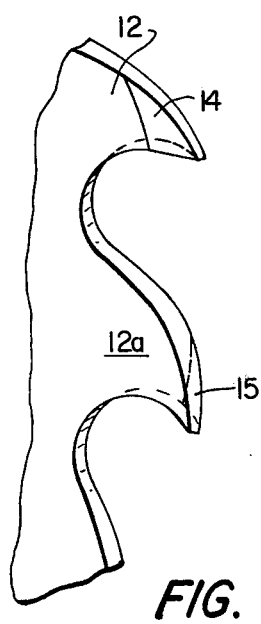
FIG. 1
FIG. 4
FIG. 5
FIG. 3
FIG. 2

TOOTH STRUCTURE FOR BURR-FREE CUTTING SAW BLADE

This invention relates to tooth structure for a saw blade.

BACKGROUND OF THE INVENTION

In some circumstances it is highly desirable to provide a saw blade which can cut through various work materials without leaving a burr on the severed portion of the work material.

An example of a prior art structure intended to perform this function is found in German Pat. No. 635,034 in which the teeth are shaped such that the cutting edge is inclined and extends entirely across the width of each tooth. While the inclined edge is desirable, as a result of this rising edge, transverse forces are produced during the cutting process which have a disadvantageous influence on the cutting direction of the saw blade. Because of the fact that the tooth inclination is uniform in all of the teeth, and all of the teeth extend entirely across the blade width, the transverse forces tend to deflect the blade as the cut is made and it is extremely difficult to make a cut which is exactly straight.

BRIEF DESCRIPTION OF THE INVENTION

Accordingly, it is an object of the present invention to provide a tooth structure for a saw blade which is capable of making a burr-free cut, but which avoids the adverse influence of transverse forces, thereby permitting a straight cut.

Briefly described, the invention includes a saw blade for burr-free cutting of materials, the blade being of the type having generally planar side surfaces lying in substantially parallel planes and a plurality of cutting teeth along an edge thereof, the blade having a predetermined cutting direction parallel with the side surfaces, the improvement wherein each of the teeth includes a cutting edge extending transversely across only a predetermined portion of the distal end of the tooth from one of said side surface planes to a point between said planes, said cutting edge lying along a line which is inclined relative to a line extending perpendicularly between the planes of said side surfaces, and an inclined generally triangular surface extending from said point to the other of said side surface planes, and wherein, in a first set of blade teeth including every other tooth, the cutting edges extend inwardly from one of said planes and, in a second set of teeth including the remaining teeth the cutting edges extend inwardly from the other one of said planes.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 schematically illustrates a plan view of a saw blade in accordance with the invention cutting through a workpiece;

FIG. 2 is an enlarged partial side elevation of the blade of FIG. 1 in the direction of arrow A;

FIG. 3 is an enlarged partial edge view of the blade of FIG. 1 in the direction of arrow B;

FIG. 4 is an enlarged sectional view along line 4—4 of FIG. 3; and

FIG. 5 is an enlarged partial sectional view along line 5—5 of FIG. 3.

The tooth structure in accordance with the present invention will be shown and described in the context of a circular saw blade, although it will be recognized that the same tooth structure can be adapted for use in a straight blade in a jig or band saw. As shown in FIG. 1, the circular saw blade 1 is cutting through a round workpiece 4. The sawblade 1 is attached to a rotating drive shaft 2 by a conventional clamping apparatus including an internally threaded nut 8 on the threaded end of shaft 2 with clamping discs or washers 9 or 9a on opposite sides of the blade. A schematically shown vice or gripping mechanism 3 of conventional type firmly grips workpiece 4, the clamped portion 5 of the workpiece being held thereby and the unclamped portion 6 being that portion which is to be severed without burrs. In the illustration shown, blade 1 is in the terminal phase of the cutting process wherein unclamped portion 6 of the workpiece is almost entirely severed from portion 5, the inclination of the cutting edges of the blade forming a generally wedge-shaped cutting residue 7 which is still connected by its thicker portion to clamped portion 5, the thinner portion of the residue being adjacent unclamped portion 6. It will be readily apparent that portion 6 will thus be severed from portion 5 without burrs, and, since the cutting residue 7 is cuttingly removed in the cutting direction after portion 6 is removed from the thinner to the thicker portion, burr-free cutting will also occur at clamped portion 5.

FIGS. 2-5 show the structure of the cutting teeth in accordance with the invention in greater detail, FIG. 3 showing in an edge view, the cutting edges 10 and 10a of teeth 12 and 12a, respectively, which cutting edges extend in the embodiment shown at substantially right angles relative to the side surfaces 11 and 13 of the teeth. As seen in FIG. 1, in a tangential direction, these same cutting edges 10 and 10a are developed rising from one end adjacent the plane of side surface 11 to the other end at the point of intersection with the plane of the opposite lateral surface 13. Since the cutting edges 10 and 10a are approximately at right angles to surface 11, considered in the direction of motion of the teeth, and are inclined at their outer surface portion as seen in FIG. 1, the tooth shape is formed such that the flank, base and face surfaces of the tooth are determined by an angle deviating from the saw blade axis.

In the sequence of the teeth 12, 12a, etc., the tooth 12 has been formed with a slanting surface 14, the shape of which is determined by a distance 16 with respect to lateral surface 11, and by an angle 18 which is different from the angle of inclination of cutting edge 10, as best seen in FIG. 4. As seen in FIG. 5, the succeeding tooth 12a is formed with an inclined surface 15 which is defined by distance 17 from surface 13 and by an angle 19 which is also different from the inclination of the cutting edge 10a. As will be seen in FIG. 3, these surfaces 14 and 15 are generally triangular, although edges thereof may have curving portions because of the curving nature of the teeth themselves as illustrated in FIG. 2. The lateral distances 16 and 17 can be equal to or different from each other, and the angles 18 and 19 similarly may be equal to each other or different.

As shown in FIGS. 2-5, the distance 16 in the embodiment shown is selected to be greater than the distance 17 and the angle 18 is selected smaller than the angle 19.

As previously indicated, blades other than circular blades can employ teeth in accordance with the invention, such as handsaw blades, hacksaw blades and the like.

Blades formed with teeth in accordance with the invention as described herein provide advantages residing particularly in the fact that, as a result of the alternating chamfering angles at the ends of the cutting edges of the teeth, the cutting pressure acting on each individual tooth is decreased. Additionally, a distribution of the cutting forces is achieved because of the alternating disposition of the cutting edges, resulting in the fact that the surface life of the saw blade is considerably improved and the cutting direction of the saw blade is more easily retained in a straight fashion.

While one advantageous embodiment has been chosen to illustrate the invention, it will be understood by those skilled in the art that various changes and modifications can be made therein without departing from the scope of the invention as defined in the appended claims.

What is claimed is:

1. A saw blade for burr-free cutting of materials, the blade being of the type having generally planar side surfaces lying in substantially parallel planes and a plurality of cutting teeth along one edge thereof, said blade having a predetermined cutting direction parallel with said side surfaces, the improvement wherein
   each of said teeth includes
   a cutting edge extending transversely across only a predetermined portion of the distal end of the tooth from one of said side surface planes to a point between said planes, said cutting edge lying along a line which is inclined relative to a line extending perpendicularly between the planes of said side surfaces, and
   an inclined generally triangular surface extending from said point to the other of said side surface planes,
   and wherein, in a first set of blade teeth including every other tooth, the cutting edges extend inwardly from one of said planes and, in a second set of teeth including the remaining teeth the cutting edges extend inwardly from the other one of said planes.

2. A saw blade according to claim 1 wherein the distance between said point and said one of said planes in said first set of teeth is greater than the distance between said point and the other one of said planes in said second set of teeth.

3. A saw blade according to claim 1 wherein the angle of inclination of said triangular surfaces in the teeth of said first set is different from the angle of inclination of said surfaces in said second set.

4. A saw blade according to claim 1 wherein the line in which said cutting edge lies in substantially perpendicular to the direction of cutting motion of said teeth.

* * * * *